United States Patent [19]

Kirker et al.

[11] Patent Number: 5,037,530
[45] Date of Patent: Aug. 6, 1991

[54] CATALYTIC CRACKING WITH LAYERED SILICATES

[75] Inventors: Garry W. Kirker, Washington Township, Gloucester County, N.J.; Thomas F. Degnan, Jr., Yardley; Albin Huss, Jr., Chadds Ford, both of Pa.; Michael E. Landis, Woodbury, N.J.

[73] Assignee: Mobil Oil Corporation, Fairfax, Va.

[21] Appl. No.: 396,712

[22] Filed: Aug. 22, 1989

[51] Int. Cl.$^5$ .............................................. C10G 11/05
[52] U.S. Cl. ..................................... 208/118; 502/84; 208/119; 208/120; 208/121; 208/122
[58] Field of Search .............. 208/120, 118, 119, 121, 208/122; 502/84

[56] References Cited

U.S. PATENT DOCUMENTS

| | | | |
|---|---|---|---|
| 4,552,647 | 11/1985 | Hettinger, Jr. et al. | 208/120 |
| 4,621,070 | 11/1986 | Pinnavaia et al. | 502/84 |
| 4,717,513 | 1/1988 | Lewis et al. | 502/84 |
| 4,742,033 | 5/1988 | Harris et al. | 502/68 |
| 4,753,909 | 6/1988 | Bousquet et al. | 502/84 |
| 4,775,461 | 10/1988 | Harris et al. | 502/84 |
| 4,812,222 | 3/1989 | Kirku et al. | 208/111 |
| 4,831,005 | 3/1989 | Aufdembrink | 502/242 |
| 4,831,006 | 5/1989 | Aufdembrink | 502/242 |
| 4,855,268 | 8/1989 | Raythatha | 502/84 |
| 4,859,648 | 8/1989 | Landis et al. | 502/84 |
| 4,924,337 | 5/1990 | Herbst et al. | 502/67 |
| 4,924,587 | 5/1990 | Aufdembrink | 502/242 |

Primary Examiner—Helane E. Myers
Attorney, Agent, or Firm—Alexander J. McKillop; Charles J. Speciale; Edward F. Kenehan, Jr.

[57] ABSTRACT

There is provided a process for cracking hydrocarbon feedstocks which include large hydrocarbon molecules. Examples of such feedstocks are those which include a large proportion of resids. The catalyst used in this process comprises a layered silicate, such as magadiite, containing interspathic polymeric silica which serves to prop open the layers.

34 Claims, No Drawings

CATALYTIC CRACKING WITH LAYERED SILICATES

CROSS-REFERENCE TO RELATED APPLICATIONS

This application is also related to copending U.S. patent application Ser. No. 879,787, filed June 27, 1986, now U.S. Pat. No. 4,859,648 which is a continuation in part of U.S. patent application Ser. No. 687,414, filed Dec. 28, 1984, now abandoned. The entire contents of the above-mentioned applications in this Cross-Reference section are expressly incorporated herein by reference.

BACKGROUND

This application is directed to the production of high quality hydrocarbon fractions by cracking high boiling hydrocarbons.

Catalytic cracking is employed in petroleum refining operations to convert gas oils to higher valued hydrocarbons such as gasoline and distillates, e.g., naphtha and kerosine. These gas oils may come from a number of sources such as atmospheric distillation columns, vacuum distillation columns, cokers and recycle streams from the catalytic cracker. The properties of these gas oils vary with the sources from which they come.

In atmospheric distillation, crude oil is subjected to temperatures of up to about 650° F. (343° C.). Higher temperatures tend to thermally degrade the hydrocarbons in the crude oil feedstock. From the atmospheric distillation columns the following fractions may be obtained: a gasoline fraction having a boiling point of less than about 300° F. (149° C.); a naphtha fraction having a boiling range of between about 300° F. (149° C.) and about 360° F. (182° C.); a kerosine fraction having a boiling range of between about 360° F. (182° C.) and about 460° F. (238° C.); at least one gas oil fraction having a boiling range of between about 460° F. (238° C.) and about 650° F. (343° C.); and an atmospheric residua fraction having a boiling point of greater than 650° C. (343° C.). The atmospheric residua may comprise a substantial portion, e.g., from about 30% to about 50% by volume, of the whole crude which is subjected to atmospheric distillation.

As mentioned previously, subjecting the hydrocarbons in a petroleum feedstock to temperature of greater than 650° F. (343° C.) tends to result in the thermal degradation of hydrocarbon. However, one or more relatively heavy gas oil fractions can be separated from atmospheric residua by subjecting this atmospheric residua to vacuum distillation, whereby higher boiling fractions are obtained. In this way, one or more gas oil fractions having a boiling range between about 650° F. (343° C.) and about 1000° F. (538° C.) may be obtained. The vacuum residua having an initial boiling point of greater than about 1000° F. (538° C.) may comprise up to about 25% by volume, e.g., from about 10% to about 25% by volume of a readily refinable whole crude.

Larger, high-boiling temperature hydrocarbons may be converted to smaller, lower-boiling hydrocarbons by cracking processes. Such cracking processes include thermal cracking, which takes place in the absence of a catalyst, and catalytic cracking, which takes place in the presence of a catalyst. Gas oils, which have been separated from petroleum residua, when derived from clean, readily refinable whole crude, tend to be excellent feedstocks for catalytic cracking. However, petroleum residua, including atmospheric residua and, especially, vacuum residua, are far less suitable for inclusion in catalytic cracking feedstocks for a number of reasons. First, such residua fractions contain a large proportion of very large hydrocarbon molecular species, e.g., having boiling points of greater than about 1000° F. (538° C.). Such large hydrocarbon molecules, particularly polynuclear molecules, may tend to be less reactive and may tend to be too large to make effective contact with the active sites of the cracking catalyst. Also, the refining process tends to concentrate, into the residua, species contained in the whole crude which tend to poison the cracking catalyst or otherwise interfere with the catalytic cracking process. Such species include nitrogen, metals such as nickel and vanadium, and carbon residue as measured by CCR, wt. %. In view of these factors, residua fractions tend to be avoided as feedstocks or components thereof for catalytic cracking processes. Instead, residua fractions, particularly vacuum residua, tend to be processed by thermal cracking, typically in a coker.

In accordance with such coking operations, various liquid, thermally cracked products are obtained including coker gasoline and higher boiling fractions. The liquid fraction which has the highest boiling point is a coker gas oil fraction which may have a boiling point of, e.g., from about 450° F. (232° C.) to about 850° F. (454° C.). This coker gas oil may be used as a feedstock for catalytic cracking along with other gas oils from atmospheric and vacuum distillation.

As mentioned previously, when relatively clean, readily refinable whole crudes are refined, the gas oils obtained therefrom can readily be further processed by catalytic cracking. However, when inferior crudes, having a particularly large portion of nitrogen, metals, carbon residue and/or large hydrocarbon molecules, are refined, these species which adversely affect catalytic cracking tend to be carried over in large concentration into even the gas oil fractions as well as the residua fractions of the crude. Such inferior crudes include natural petroleum from certain locations as well as certain synthetic crudes derived from coal, tar sands and shale oil. Gas oils derived from such inferior crudes may not be suitable for use as feedstocks for catalytic cracking.

There is a need for catalytic cracking processes for converting residua and gas oil fractions which contain large hydrocarbon molecules and/or species found in residua which tend to poison cracking catalysts or otherwise adversely effect the catalytic cracking process.

SUMMARY

According to one aspect of this application, there is provided a process for cracking a hydrocarbon feedstock, said hydrocarbon feedstock having at least 50 weight percent of hydrocarbons having a boiling point of greater than 343° C., said process comprising contacting said feedstock with a cracking catalyst under sufficient cracking conditions, said catalyst comprising a layered silicate containing interspathic polymeric silica.

According to another aspect of this application, there is provided a process for cracking a hydrocarbon feedstock, said hydrocarbon feedstock having at least 30 weight percent of hydrocarbons having a boiling point of greater than 454° C., said process comprising contacting said feedstock with a cracking catalyst under sufficient cracking conditions, said catalyst comprising a layered silicate containing interspathic polymeric silica.

According to another aspect of this application, there is provided a process for cracking a hydrocarbon feedstock, said hydrocarbon feedstock having at least 10 volume percent of hydrocarbons having a boiling point of greater than 538° C., said process comprising contacting said feedstock with a cracking catalyst under sufficient cracking conditions, said catalyst comprising a layered silicate containing interspathic polymeric silica.

EMBODIMENTS

The catalyst described herein comprises a layered silicate material. Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slid=across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area. In particular, the distance between the interlamellar layers can be increased substantially by absorption of various swelling agents such as water, ethylene glycol, amines, ketones, etc., which enter the interlamellar space and push the layers apart. However, the interlamellar spaces of such layered materials tend to collapse when the molecules occupying the space are removed by, for example, exposing the clays to high temperatures. Accordingly, such layered materials having enhanced surface area are not suited for use in chemical processes involving even moderately severe conditions.

The extent of interlayer separation can be estimated by using standard techniques such as X-ray diffraction to determine the basal spacing, also known as "repeat distance" or "d-spacing". These values indicate the distance between, for example, the uppermost margin of one layer with the uppermost margin of its adjoining layer. If the layer thickness is known, the interlayer spacing can be determined by subtracting the layer thickness from the basal spacing.

The catalyst employed in the present invention comprises a layered silicate containing interspathic polymeric silica. The interlayer distance of the silicate is such that polycyclic hydrocarbon components of the feed can pass between adjacent layers of the silicate, preferably a distance greater than about 10 angstroms or even 15 angstroms, say about 15 to 20 angstroms. The catalyst possesses cracking activity, which may be enhanced by the presence of an interspathic polymeric oxide comprising an element selected from the group consisting of Al, B, Cr, Ga, In, Mo, Nb, Ni, Ti, Tl, W and Zr, e.g., polymeric alumina. Preferably, such "pillared" materials are thermally stable, i.e., capable of withstanding calcining at a temperature of about 450° C. for at least 2 hours without significant reduction (e.g., not greater than 10 or 20%) in the spacing between the silicate layers. Preferably, such materials can withstand prolonged exposure to the conditions encountered during cracking. Polymeric interspathic silicas displaced between silicate layers are considered to include oxides of two or more repeating units, preferably three or more repeating units, e.g., four or more or even five or more repeating units. The extent of polymerization of the interspathic polymeric silica is believed to affect the ultimate interlayer separation of the layered product; that is to say, the greater the extent of polymerization occurring, the greater the interlayer distance resulting in the pillared layered silicate. A layered material suited for use in the present cracking process, having a desired interlayer spacing can be prepared according to the method set out in U.S. patent application Ser. No. 897,787, filed June 27, 1986, incorporated herein by reference. In this method, the interlayer spacing of the layered material can be tailored by careful selection of the "propping" agent used to separate the layers during treatment with interspathic polymeric silica precursors which are eventually converted to the thermally stable polymeric silica "pillars." Indeed, a wide range of interlayer spacings can be achieved by this method. Interlayer distances can range anywhere from 2 to 30 angstroms or more, e.g., greater than 5, 10, 15 or 20 angstroms, depending largely on the type of "propping" agent used as well as the layered chalcogenide being treated. For the purpose of the present invention, interlayer distances which result in interlayer spacings large enough to accommodate polycyclic aromatics are desirable, e.g., interlayer spacings greater than 8 angstroms or preferably greater than 10 angstroms, e.g., about 10 to 20 angstroms.

The pillared layered silicates employed herein can be prepared by treating a layered silicate which contains ion exchange sites having interspathic cations associated therewith, with an organic compound which is a cationic species or capable of forming a cationic species to effect exchange with the interspathic cations. An electrically neutral compound capable of conversion to the interspathic polymeric metal or non-metal oxide is provided between the layers of the treated layered silicate. The compound is then converted to the interspathic polymeric silica to form the layered material.

The pillared layered silicate employed in the present invention can be prepared by treating a layered silicate, e.g., a high silica alkali silicate such as synthetic magadiite, or synthetic kenyaite. These pillared layered silicate materials possess a framework composed essentially of only tetrahedral sheets, i.e. silicon is coordinated with four oxygen atoms, condensed on each other. These materials lack octahedral sheets, such as those found in clays, wherein an element such as aluminum is coordinated with six oxygen atoms. Besides interspathic polymeric silica, interspathic polymeric oxides of one or more elements selected from the group consisting of B, Al, Ga, In and Tl can also be incorporated between the layers of the silicate either separate from or incorporated into the interspathic polymeric silica pillars. Interspathic polymeric alumina is particularly useful in imparting acidic activity to the layered silicate. Interspathic polymeric oxides containing silica-alumina are a preferred pillar for these layered silicates.

Pillared silicates containing from about 5 to 50 wt % silica-alumina incorporated as the pillar material are desirable. Particularly preferred are silicates containing from about 10 to 20 wt % silica-alumina as the pillared material. The silica/alumina molar ratio ($SiO_2/Al_2O_3$) of the pillared material may vary between about 5 to 1000 or even greater.

Layered silicate materials of relatively high interplanar distance (d-spacing), e.g., greater than about 10, 15, 18, 20, 25, or even 30 or more angstroms, can be prepared using the above-discussed techniques. These materials are capable of being exposed to severe conditions such as those encountered in calcining, e.g., at temperatures of about 450° C. for about two or more hours, e.g., four hours, in nitrogen or air, without significant decrease, say, e.g., less than about 10%, in interlayer distance. The size of interspathic polymeric silica contained within the final product can be greatly varied because the polymeric silica precursor species are introduced in an electrically neutral form such that the amount of interspathic material incorporated within the layered silicate is not dependent upon the charge density of the original layered silicate starting material. Charge density should be taken into consideration in determining the suitability of the cationic species introduced between the layers in the procedure used to prop open the layers prior to pillaring. The use of an electrically neutral polymeric oxide precursor allows the formation of materials in which the interlayer spacing can be widely varied.

The layered silicate starting material can contain ion exchange sites having interspathic cations associated therewith. Such interspathic cations may include hydrogen ion, hydronium ion or alkali metal cation. The starting material is treated with a "propping" agent comprising a source of organic cation, which source may include the cation itself, in order to effect an exchange of the interspathic cations resulting in the layers of the starting material being propped apart. In particular, alkylammonium cations have been found useful. Thus $C_3$ and larger alkylammonium cations, e.g., n-octylammonium, can be readily incorporated within the interlayer species of the layered silicates, serving to prop open the layers in such a way as to allow incorporation of the polymeric chalcogenide precursor. The extent of the interlayer spacing can be controlled by the size of the organoammonium ion employed so that use of the n-propylammonium cation can achieve a d-spacing of about 2 to 5 Å or an opening of about 2–3 Å, whereas to achieve an interlayer opening of 10 to 20 Å, an n-octylammonium cation or a cation of equivalent length is required. The organic ammonium cations separating the silicate layers may also be formed in situ by reaction of the neutral amine species with interlayer hydrogen or hydronium cations of the layered silicate starting material.

The polymeric oxide pillars are formed from a precursor material which is preferably introduced between the layers of the organic "propped" species as a cationic, or more preferably, electrically neutral, hydrolyzable compound of the desired elements. The precursor material is preferably an organic compound containing said desired elements which is a liquid under ambient conditions. In particular, hydrolyzable compounds, e.g., alkoxides, of the desired elements of the pillars are utilized as the precursors. Suitable polymeric silica precursor materials include tetraalkylsilicates, e.g., tetrapropylorthosilicate, tetramethylorthosilicate and, most preferably, tetraethylorthosilicate. Introduction of interspathic polymeric oxide of an element selected from the group consisting of Al, B, Cr, Ga, In, Mo, Nb, Ni, Ti, Tl, W, and Zr to the pillar system can be achieved by contacting a hydrolyzable compound of the desired element with the organic "propped" species before, after or simultaneously with the contacting of the layered chalcogenide with the silicon compound. The hydrolyzable aluminum compound employed may be an aluminum alkoxide, e.g., aluminum isopropoxide.

After hydrolysis to produce the polymeric oxide pillars and calcination to remove the organic propping agent, the final pillared product may contain residual exchangeable cations. Such residual cations in the layered material can be ion exchanged by known methods with other cationic species to provide or alter the catalytic activity of the pillared product. In particular, hydrogenation components containing at least one element selected from the group consisting of Group VIA metals (Cr, Mo and W) and Group VIIIA metals (Fe, Co, Ni, Ru, Rh, Pd, Os, Ir and Pt) can be introduced by ion-exchange or impregnation techniques known in the art. Representative ion exchange techniques are disclosed in a wide variety of patents including U.S. Pat. Nos. 3,140,249; 3,140,251; and 3,140,253, all of which are incorporated herein by reference. Generally, when the catalyst of the present invention contains such Group VIA or VIIIA metals it can contain about 0.1 to 20 weight percent, preferably about 0.5 to 15 weight percent of such metals. The present catalyst may also be free of intentionally added hydrogenation components, e.g., Group VIA metals and/or Group VIIIA metals. It will be understood that the catalyst may be free of intentionally added hydrogenation components, yet still contain trace quantities of such Group VIA and/or VIIIA metals, said metals being included as unavoidable impurities in the reagents used to prepare the catalyst.

The polymeric oxide precursor-containing product can be exposed to suitable conversion conditions, such as hydrolysis and/or calcination to form the layered material employed in the present invention. The hydrolysis step may be carried out by any method, for example, by interspathic water already present in the organic-"propped" layered silicate material. Because of the effect of interspathic water on hydrolysis, the extent of hydrolysis may be modified by varying the extent to which the organic-"propped" species is dried prior to addition of the polymeric oxide precursor. As noted earlier, the product after conversion to the polymeric oxide form may be exposed to conditions which remove organic compounds such as the organic cation propping agents, e.g., exposure to elevated temperatures such as those encountered by calcining in air or nitrogen. Such products, especially when calcined, exhibit high surface area, e.g., greater than 200, 300, 400 or even 600 $m^2/g$, and a certain degree of thermal and hydrothermal stability.

The hydrothermal stability of the pillared layered silicates can be increased by ion exchanging cations in these silicates with a sufficient amount (i.e. sufficient to increase the hydrothermal stability of the catalyst) of rare earth cations. Such rare earth cations include cations of cerium, lanthanum, praseodymium, neodymium, promethium, samarium, europium, gadolinium, terbium, dysprosium, holmium, erbium, thulium, ytterbium, lutetium and mixtures thereof. A typical ion exchange technique would be to contact the layered silicate with a salt of the desired replacing rare earth cations. Examples of such salts of rare earth cations include the halides, e.g. chlorides, nitrates and sulfates. The amount of rare earth cations, expressed in terms of $RE_2O_3$, in the exchanged layered silicate may be at least 0.5 weight percent of the layered silicate.

It is known that the hydrothermal stability of certain alumina rich zeolites having the faujasite structure, such as zeolite Y, can be increased by exchanging cations in these particular zeolites with rare earth cations. Although the reason for this enhanced stability is not fully understood, it is believed to be associated with the occupation by rare earth cations of void spaces in the sodalite cages of the zeolite Y. At the time of the discovery that rare earth cations could stabilize pillared layered silicates, there was no reason to expect this surprising result.

The pillared silicates can be composited with porous inorganic oxide matrix materials such as silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of pillared silicate component and inorganic matrix, on an anhydrous basis, may vary widely with the silicate content ranging from about 1 to about 99 percent by weight and more usually in the range of from about 5 to about 80 percent by weight of the dry composite.

Layered silicates, e.g., high silica alkali silicates such as magadiite, natrosilite, kenyaite, makatite, nekoite, kanemite, okenite, dehayelite, macdonaldite and rhodesite, unlike swellable clays, lack octahedral sheets, i.e., sheets composed of atoms which are octahedrally coordinated with oxygen atoms. Such high silica alkali silicates, as well as their synthetic analogues are well-suited as starting materials used in preparing the pillared layered silicates employed in the process of the present invention. Without stable intercalated pillars, these starting materials tend to undergo collapse of their layers at elevated temperatures, which results in low porosity and low surface area.

The layered silicate starting materials known as high silica alkali silicates, whose layers lack octahedral sheets, can be prepared hydrothermally from an aqueous reaction mixture containing silica and caustic at relatively moderate temperatures and pressures. These layered silicates may contain tetracoordinate framework atoms other than Si. Such layered silicates can be prepared by co-crystallizing in the presence of non-silicon tetravalent elements, e.g., those selected from the group consisting of B, Al, Ga, In and Tl as well as any other such elements which are catalytically useful when incorporated in the silicate structure. Alternatively, non-silicon framework elements already in a layered silicate may be substituted by a tetracoordinate element. Both co-crystallized and substituted layered high silica alkali silicates may be treated by the procedure described above to provide layered materials containing interspathic polymeric oxide pillars.

Synthetic magadiite materials which contain interspathic polymeric oxides are particularly suited to use in the cracking process of the present invention. Synthetic magadiite is readily synthesized hydrothermally from a reaction mixture containing inexpensive sources of silica and caustic. Tetracoordinate elements other than silicon, e.g., those selected from the group consisting of B, Al, Ga, In, Tl and other catalytically useful metals, may be added to the reaction mixture to produce synthetic magadiite layered silicates. Preferably, such elements are selected from the group consisting of Al and Ga. An organic directing agent may also be added to the reaction mixture. The reaction mixture for synthetic layered silicate materials can be described in molar ratios as follows:

$SiO_2/X_2O_3$ = 10 to infinity where X can be B, Al, B, Ga, In and/or Tl or other catalytically useful metal
$M^+OH^-/SiO_2$ = 0 to 0.6, (preferably 0.1–0.6) M = an alkali metal
$H_2O/SiO_2$ = 8–500
$R/SiO_2$ = 0–0.4

The reaction mixture can be maintained at a temperature of about 100° to 200° C. for anywhere from about 1 to 150 days in order to form a product having the following composition:

% N = 0 to 3, e.g., 0 to 0.3
$SiO_2/X_2O_3$ = 10 to infinity where X may be in the tetrahedral or octahedral position
$M_2O/SiO_2$ = 0 to 0.5, e.g., 0.05–0.1

The synthetic layered silicate materials thus prepared have a low surface area. Introduction of interspathic polymeric oxides according to the above-described procedure can increase the surface area of these materials. Generally, the synthetic magadiite (or layered silicate) material is acidified by any suitable means, e.g., treatment with aqueous 0.1N HCl, and thereafter treated with a "propping" agent. A suitable compound capable of conversion to a polymeric oxide is combined with the "propped" layered silicate and the resulting material can then be calcined to remove residual organics.

The pillared silicate catalyst may be used alone or in combination with other cracking catalysts. The pillared silicate catalysts are particularly advantageous for cracking large molecules in the hydrocarbon feed. Further conversiion of the smaller cracked materials may be effectively carried out by a zeolite component. The cracking process is applicable to both moving bed and fluid catalytic cracking processes.

When used in combination with a conventional cracking catalyst the pillared layered material may be incorporated into the same particle as the conventional cracking component (composite catalyst) or it can be added to the cracking unit as a separate particle (additive catalyst). The conventional cracking catalyst may be amorphous or contain zeolites, especially large pore zeolites. Preferably such large pore zeolites have a Constraint Index less than about 2, preferably less than about 1, as described hereinafter. For purposes of this application, the term "zeolite" is meant to represent the class of porotectosilicates, i.e., porous crystalline silicates, that contain silicon and oxygen atoms as the major components. Other components may be present in minor amounts, usually less than 14 mole %, and preferably less than 4 mole %. These components include aluminum, gallium, iron, boron and the like, with aluminum being preferred, and used herein for illustration purposes. The minor components may be present separately or in mixtures in the catalyst. They may also be present intrinsically in the structure of the catalyst.

The silica-to-alumina mole ratio referred to may be determined by conventional analysis. This ratio is meant to represent, as closely as possible, the ratio in the rigid anionic framework of the zeolite crystal and to exclude aluminum in the binder or in cationic or other forms within the channels. Zeolites with a silica-to-alumina mole ratio of at least 10 are useful, and such zeolites may have much higher silica-to-alumina mole ratios, i.e., ratios of at least 50:1 or at least 500:1.

A convenient measure of the extent to which a zeolite provides control to molecules of varying sizes to its internal structure is the Constraint Index of the porous crystalline silicate. Porous crystalline silicates which provide a highly restricted access to and egress from its internal structure have a high value for the Constraint Index, and zeolites of this kind usually have pores of small size, e.g. less than 5 angstroms. On the other hand, porous crystalline silicates which provide relatively free access to the internal porous crystalline silicate structure have a low value for the Constraint Index, and usually pores of large size, e.g. greater than 7 angstroms. The method by which Constraint Index is determined is described fully in U.S. Pat. No. 4,016,218, incorporated herein by reference for details of the method.

Constraint Index (CI) values for some typical large pore materials are:

|  | CI (at test temperature) |  |
| --- | --- | --- |
| ZSM-4 | 0.5 | (316° C.) |
| ZSM-12 | 2.3 | (316° C.) |
| ZSM-20 | 0.5 | (371° C.) |
| ZSM-38 | 2 | (510° C.) |
| ZSM-50 | 2.1 | (427° C.) |
| TEA Mordenite | 0.4 | (316° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Zeolite Beta | 0.6–2.0 | (316° C.–399° C.) |

The above-described Constraint Index provides a helpful definition of those porous crystalline silicates which are particularly useful in the instant invention. The very nature of this parameter and the recited technique by which it is determined, however, admit of the possibility that a given porous crystalline silicate can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular porous crystalline silicate. This explains the range of Constraint Indices for some zeolites, such as zeolite beta.

It is to be realized that while the above CI values typically characterize the specified porous crystalline silicates, such values are the cumulative result of several variables useful in the determination and calculation thereof. Thus, for a given zeolite exhibiting a CI value of about 2 or less, depending on the temperature employed during the test method within the range of 290° C. to about 538° C., with accompanying conversion between 10% and 60%, the CI may vary. Likewise, other variables such as the crystal size of the porous crystalline silicate, the presence of possibly occluded contaminants and binders intimately combined with the zeolite may affect the CI. It will accordingly be understood to those skilled in the art that the CI, as utilized herein, while affording a highly useful means for characterizing the porous crystalline silicates of particular interest is approximate, taking into consideration the manner of its determination, with the possibility, in some instances, of compounding variable extremes. However, in all instances, at a temperature within the above-specified range of 290° C. to about 538° C., the CI will have a value for any given porous crystalline silicate of particular interest herein of about 2 or less, preferably about 1 or less.

The large pore zeolites, i.e., those zeolites having a Constraint Index of about 2 or less, are well known to the art and have a pore size sufficiently large to admit the vast majority of components normally found in a normal feed chargestock. Such zeolites can have a pore size in excess of 7 angstroms and are represented by zeolites having the structure of, e.g., zeolite beta, Zeolite Y, Zeolite X, Ultrastable Y (USY), Dealuminized Y (Deal Y), REY, L, Faujasite, Mordenite, TEA Mordenite, UHP-Y, ZSM-4, ZSM-12, ZSM-18, ZSM-20, ZSM-50, LZ-210, LZ-210-M, LZ-210-T, and LZ-210-A.

Some of these large pore zeolites are more particularly described in U.S. Pat. Nos. 3,308,069 and U.S. Pat. No. Re. 28,341 (zeolite beta); U.S. Pat. No. 3,923,639 (ZSM-4); U.S. Pat. No. 3,832,449 (ZSM-12); U.S. Pat. No. 3,950,496 (ZSM-18); U.S. Pat. No. 3,972,983 (ZSM-20); U.S. Pat. No. 4,640,849 (ZSM-50); U.S. Pat. No. 3,293,192 and U.S. Pat. No. 3,449,070 (USY); U.S. Pat. No. 3,442,795 (Deal Y); U.S. Pat. No. 4,401,556 (UHP-Y) and U.S. Pat. No. 4,534,853 (LZ-210, LZ-210-M, LZ-210-T, and LZ-210A) respectively, the entire contents of which are incorporated by reference.

The pillared layered silicate catalysts described herein are particularly suited for cracking feedstocks which contain a large proportion of relatively large hydrocarbon molecules. For example, the hydrocarbon feedstock may comprise (1) at least 50 weight percent of hydrocarbons having a boiling point of greater than 343° C., and/or (2) at least 30 weight percent, e.g., at least 45 weight percent, of hydrocarbons having a boiling point of greater than 454° C., and/or (3) at least 10 volume percent, e.g., at least 15 volume percent, of hydrocarbons having a boiling point of greater than 538° C. The hydrocarbon feedstock may also comprise, consist of or consist essentially of a residua fraction. For example, the hydrocarbon feedstock may comprise (1) at least 30 wt. % of a residua fraction having an initial boiling point of at least 343° C. (e.g., an atmospheric resid) and/or (2) at least 15 wt. % of a residua fraction having an initial boiling point of at least about 538° C. (e.g., a vacuum resid). The feedstock may be, e.g., a blend of a residua fraction with one or more gas oils, said gas oils having an initial boiling point of at least 232° C. The hydrocarbon feedstock may or may not be subjected to a hydrotreating process to remove impurities, such as nitrogen and metals, prior to contact with the cracking catalyst.

The hydrocarbon feedstock may contain impurities normally found therein, especially those found in residua fractions. For example, the hydrocarbon feedstock may comprise (1) at least 500 ppm of nitrogen, and/or (2) at least 2 ppm of vanadium, and/or (3) at least 1 ppm of nickel, and/or (4) at least 1 wt. %, e.g., from 1 to 3 wt. %, of CCR (Conradson Carbon Residue).

The cracking reaction may occur at a temperature ranging from about 250° C. to about 500° C. and liquid hourly space velocities ranging from about 0.05 to about 10. The cracking reaction may occur in the absence of added hydrogen.

Alpha values are reported in certain examples appearing hereinafter. It is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078, in the *Journal of Catalysis*, Vol. 4, p. 527 (1965); Vol. 6, p. 278 (1966); and Vol. 61, p. 395 (1980), each incorporated herein by reference as to that description. The experimental conditions of the test preferably include a constant temperature of 538° C. and a variable flow rate as described in detail in the *Journal of Catalysis*, Vol. 61, p. 395.

EXAMPLE 1

For comparative testing, a commercial fluid/catalytic cracking (FCC) catalyst containing zeolite REY was obtained. More particularly, this catalyst was an equilibrium FCC catalyst designated as FS-30 obtained from the Filtrol Corporation. Properties of this catalyst are set forth in Table 1.

TABLE 1

| Properties of the FCC Catalyst of Example 1 | |
|---|---|
| Ash @ 1000° C., wt. % | 97.3 |
| Packed Density, g/cc | 0.96 |
| Loose Density, g/cc | 0.87 |
| Real Density, g/cc | 2.78 |
| Particle Density, g/cc | 1.37 |
| Pore Volume, cc/g | 0.37 |
| Surface Area, m$^2$g | 113.0 |
| Carbon on catalyst, wt. % | 0.17 |
| Alumina, wt. % | 43.2 |
| Silica, wt. % | 53.0 |
| Total Rare Earths as RE$_2$O$_3$, wt. % | 2.95 |
| REY, % by X-ray | 14.90 |
| Nickel, ppm | 470 |
| Vanadium, ppm | 1460 |
| Antimony, ppm | 29 |
| Iron, ppm | 5 |
| Copper ppm | 80 |
| Particle Size Dist | |
| 0 to 20 micron, wt. % | 0.0 |
| 20 to 40 micron, wt. % | 7.1 |
| 40 to 60 micron, wt. % | 35.8 |
| 60 to 80 micron, wt. % | 32.1 |
| 80+ microns, wt. % | 25.0 |

EXAMPLE 2

For comparative testing, a pillared clay catalyst was prepared. More particularly, this pillared clay catalyst was prepared according to procedures described in U.S. Pat. No. 4,176,090, the entire disclosure of which is expressly incorporated herein by reference. Properties of this pillared clay catalyst are set forth in Table 2.

TABLE 2

| Properties of the Pillared Clay Catalyst; Catalyst of Example 2 | |
|---|---|
| Na, wt. % | 0.21 |
| Al$_2$O$_3$, wt. % | 34.4 |
| SiO$_2$, wt. % | 55.2 |
| Ash @ 1000° C., wt. % | 95.2 |
| Surface Area, m$^2$/g | 342 |
| Adsorptions, (g/100 g) | |
| H$_2$O | 11.7 |
| Cy-C$_6$ | 6.7 |
| n-C$_6$ | 8.8 |
| Alpha (1000° F.) | 1 |

EXAMPLE 3

In this Example the preparation of a silica-alumina pillared magadiite catalyst is described. The catalyst was prepared by treatment of 120 g of an octylammonium form of acid-exchanged magadiite which has the following composition:

| C, wt. % | 12.5 |
|---|---|
| N, wt. % | 3.65 |
| SiO$_2$, wt. % | 48.2 |
| Ash @ 1000° C., wt. % | 49.7 | with a solution prepared by dissolving 19.7 g of aluminum isopropoxide into 746 g of tetraethylorthosilicate and heating this solution for about 23 hours. The solution was stirred at room temperature for three more days prior to the addition of the solid, octylammonium magadiite. The sample was filtered, dried and calcined at 1000° F. in air.

Properties of this pillared magadiite catalyst are set forth in Table 3.

TABLE 3

| Properties of the Synthetic Magadiite Catalyst; Catalyst of Example 3 | |
|---|---|
| Na, ppm | 135 |
| SiO$_2$, wt. % | 87.7 |
| Al$_2$O$_3$, wt. % | 2.7 |
| C, wt. % | 0.027 |
| Ash @ 1000° C., wt. % | 94.9 |
| Surface Area, M$^2$/g | 504 |
| Adsorptions, (g/100 g) | |
| H$_2$O | 19.1 |
| Cy-C$_6$ | 15.1 |
| n-C$_6$ | 13.7 |
| Alpha (1000° F.) | 7 |

EXAMPLE 4

In this Example the preparation of a steamed silica-alumina pillared magadiite catalyst is described. The catalyst of Example 3, after being used for 26 cycles in a fixed-fluid bed evaluation, was regenerated and then steamed for four hours at 1000° F. in 100% steam. Prior to steaming, the catalyst contained (100% solids bases) 0.43 wt. % C and 27 ppm V.

Properties of this steamed catalyst are set forth in Table 4.

TABLE 4

| Properties of the Synthetic Magadiite Catalyst Following Evaluation, Regeneration and Subsequent Steaming; Catalyst of Example 4 | |
|---|---|
| Na, ppm | 120 |
| SiO$_2$, wt. % | 328 |
| Adsorptions, (g/100 g) | |

TABLE 4-continued

Properties of the Synthetic Magadiite Catalyst Following Evaluation, Regeneration and Subsequent Steaming; Catalyst of Example 4

| | |
|---|---|
| $H_2O$ | 13.5 |
| $Cy-C_6$ | 5.6 |
| $n-C_6$ | 6.8 |
| Alpha (1000° F.) | 2 |

EXAMPLE 5

In this Example the preparation of a second sample of a silica-alumina pillared magadiite catalyst is described. Silica (108 g of HiSil (233)) was added to a solution of sodium hydroxide (16 g of 98.8%) dissolved in 640 g of distilled water. This suspension was vigorously stirred for 15 min., then the pH was measured as 13.17. The mixture was crystallized for three days at 150° C. under autogenous pressure stirring at 350 RPM. The mixture was cooled, examined and found to be only partially crystallized, therefore, it was reheated to 150° C. for an additional 48 hours at which time crystallization was complete. The final pH of the synthesis mixture was 11.74. This synthesis was repeated three more times in the same autoclave with exactly the same conditions except that four days at 150° C. was found to be the optimal crystallization time. Each batch was filtered, with vacuum on Buchner funnel, washed with three aliquots of 1 liter each of distilled water and then air dried at room temperature. The four batches were physically combined and analyzed as follows:

| | |
|---|---|
| $Na_2O$ | 6.5 (estimated) |
| $SiO_2$ | 78.6% |
| $Al_2O_3$ | 0.44 |
| Ash @ 100° C., wt. % | 85.12 |

A sample (350 g@85.1% ash) of the air-dried as synthesized magadiite was added to a beaker of distilled water (1.51) and titrated with 0.5N HCl (1,412 ml) to pH=2.0 and held at pH=2 for 24 hours. The sample was then washed with 10 liters of distilled water and air dried on the filter. The sodium level was determined to be 0.13 wt. %.

A sample (200 g) of the acid exchanged magadiite was treated with a solution of n-octylamine (200 g) in 3 liters of distilled water for 24 hours at room temperature, filtered with vacuum, washed with 4 liters of distilled water and air dried on the filter. The sample was dried to a cake which could be ground to a powder (@60.2% solids). The final weight recovered was 296.15 g of the octylamine-treated magadiite. A solution aluminum isopropoxide (AIP) (19 g of 98+%, ALFA) dissolved in tetraethylorthosilicate (TEOS) (747 g) was prepared in a polypropylene bottle which was heated in a steam chest for approximately 16 hr. with the cap slightly loosened on the bottle. The aluminum isopropoxide was completely dissolved prior to heating. Next, 160 g of ballmilled sample from Example 5C was added to the AIP/TEOS solution described above and stirred together at room temperature in a sealed polypropylene bottle for three days, filtered rapidly with vacuum and air dried on the filter (194.2 g recovered). The dried product was sized to #8 mesh, then heated at 5° C./min in flowing nitrogen to 530° C., held one hour, then switched to air for two additional hours. The product was found to have the following properties:

| | |
|---|---|
| $SiO_2$, wt. % | 92.6 |
| $Al_2O_3$ | 2.8 |
| Ash @ 1000° C., wt. % | 97.0 |
| Surface Area, $m^2/g$ | 684 |
| Adsorptions, g/100 g | |
| $H_2O$ | 26.2 |
| cyclohexane | 20.4 |
| n-hexane | 18.3 |
| XRD Basal Spacing | 31.5Å |
| Alpha (1000° F.) | 3 |

EXAMPLE 6

In this Example the preparation of a rare-earth exchanged, silica-alumina pillared magadiite is described. A sample (25 g) of the product of Example 5 was sized to 60-100 mesh range and then added to a 4.5 wt. % solution of rare-earth chlorides (4.5 wt. % as $RECl_3 \cdot 6H_2O$, 110 g total weight of solution). This mixture was held at 80° C. for 24 hr., cooled, washed with 1000 ml of distilled water (chloride-free), pulled air-dry on the filter, vacuum over dried, then heated at 5° C./min to 538° C. and held three hours in air at temperature. The final product had the following properties:

| | |
|---|---|
| $RE_2O_3$, wt. % | 1.3 |
| Surface Area, $m^2/g$ | 549 |
| Adsorptions, g/100 g | |
| cyclohexane | 15.5 |
| n-hexane | 14.3 |
| Alpha (1000° F.) | 3 |

EXAMPLE 7

In this Example the preparation of a steamed, rare-earth exchanged, silica-alumina pillared magadiite is described. The catalyst of Example 6 was steamed after it was tested as an unsteamed catalyst (41-cycles). The steaming was for four hours at 538° C. in 100% steam. The steamed catalyst had the following properties:

| | |
|---|---|
| Surface Area, $m^2/g$ | 403 |
| Alpha (1000° F.) | 1 |

EXAMPLE 8

Two different feedstocks were used for testing the cracking activity and selectivity of catalysts. One feedstock was a highly naphthenic Arab light gas oil (JSHGO), and the other feedstock was a highly paraffinic atmospheric resid (Statfjord). Properties of these feeds are given in Tables 5 and 6.

TABLE 5

| Properties of Arab Light Gas Oil (JSHGO) | |
|---|---|
| API Gravity, 60° F. | 21.5 |
| Aniline Point, °F. | 164.5 |
| Pour Point, °F. | 95 |
| Bromine No. | 6.2 |
| KV at 100° C. | 5.47 |
| Molecular Weight, avg | 381 |
| Refractive Index, 60° C. | 1.493 |
| Density, 70° C. | 0.885 |
| Sulfur, wt. % | 2.25 |
| Nitrogen, ppm | 900 |
| Basic Nitrogen, ppm | 401 |
| CCR, wt. % | 0.42 |
| Hydrogen, wt. % | 12.0 |
| Boiling Point Distribution, wt. % | |

TABLE 5-continued

| Properties of Arab Light Gas Oil (JSHGO) | |
|---|---|
| 75° to 330° F. | 0.0 |
| 330° to 420° F. | 0.4 |
| 420° to 650° F. | 14.4 |
| 650° to 850° F. | 52.7 |
| 850° F.+ | 32.5 |

TABLE 6

| Properties of Statfjord Atmospheric Resid | |
|---|---|
| Pour Point, °F. | 100 |
| K.V. @ 40° C. | too waxy |
| K.V. at 100° C. | 13.11 |
| CCR, wt. % | 3.53 |
| Density @ 70° C. | 0.8812 |
| Carbon, wt. % | 85.4 |
| Sulfur, wt. % | 0.63 |
| Nitrogen, ppm | 1300 |
| Hydrogen, wt. % | 12.5 |
| Ni, ppm | 1.4 |
| V, ppm | 2.9 |
| Fe, ppm | 5.2 |
| Na, ppm | 5.0 |
| Pct Non-Aromatics | 51.3 |
| Pct Aromatics | 48.7 |
| Distillation (vol % Distilled) | |
| IBP, °F. | 419 |
| 5% | 572 |
| 10% | 631 |
| 30% | 757 |
| 50% | 838 |
| 70% | 911 |
| 80% | 1005 |
| 90% | 1140 |
| Pct. Recov | 99% |

Catalysts were evaluated by a fixed-fluid bed procedure which involved charging 40 to 50 cc of the sized catalyst (80 to 200 mesh) to a 1-inch diameter × 2.5-foot long cylindrical quartz reactor. The reactor was situated in a three zone resistance furnace with independent heat controls for each zone. Helium was introduced through a porous quarts frit located in the bottom of the reactor so that it flowed upwards through the bed of catalyst at atmospheric pressure at a flow rate of 650 cc/min. (Cited flow rates were measured at room temperature). The oil was introduced through a stainless steel needle located in a side arm in the reactor so that it entered near the frit. Helium was cofed with the oil at a rate of 150 cc/min to push the oil quickly through the needle.

Reactor temperature was maintained constant at 950° F. (510° C.) throughout a five minute cycle during which oil was introduced into the reactor. Following the pump cycle, the catalyst was stripped with helium at 1200 cc/min to remove residual hydrocarbons. Air was then introduced through the bottom frit at 900 cc/min in order to burn off coke. During the regeneration cycle, the effluent stream was routed through a $CO/CO_2$ deterctor which monitored the amount of coke remaining on the catalyst. When CO and $CO_2$ fell below 0.02%, the catalyst was determined to be clean burned and the helium was again introduced into the reactor for 2 minutes at 900 cc/min to purge any remaining air.

Products were collected in a series of glass traps including one room temperature trap, one dry ice/acetone trap, and three liquid nitrogen traps. Gas coming off of the last trap was sampled during one complete pumping cycle and one stripping cycle. This was then considered representative of the gas generated during each of the cycles.

At the conclusion of a total of 7 to 15 cycles which comprised a single run, the series of traps was closed at one end and connected to a gas collection device at the other end. Gaseous products were then weathered off at room temperature overnight. The traps were weighed in the morning and the liquid products were composited and analyzed, along with the gaseous products, via FID-GC.

A mass balance was developed from a measurement of the amount of oil pumped into the reactor, the amount of liquid and gas products collected, and the coke measurement (from the integration of the CO and $CO_2$ signals over the burn time in each cycle).

Results of these evaluations are given in Tables 7-19. Conversions were calculated on net 650° F.−; 420° F.−; and 330° F.− bases. For example, the net 650° F.− conversion was calculated as follows:

$$650° F.^-conv (wt. \%) = (wt. \% \ 650° F^- \text{ in product} + wt. \% \text{ coke}) - (wt. \% \ 650° F.^- \text{ in feed}).$$

and the other conversions were calculated analogously. Product selectivities shown in Tables 7-19 were calculated based upon net conversion to 650° F.−.

In tables 16-19 the term, crackability, is used. Crackability is defined as follows:

Crackability=(net conv to 420° F.−)/(1−net conv to 420° F.−). This term, crackability, denotes the relative ease with which the feedstock is cracked at a given severity (i.e., catalyst/oil ratio, temperature, and WHSV). Kinetically, crackability is representation of the reaction rate constant. Cracking is generally modeled kinetically as a second order chemical reaction and the expression for crackability is proportional to the derived expression for second order kinetics.

TABLE 7

Comparison of JSHGO Product Distribution at 5 Cat/Oil Ratio

| | Catalyst | | |
|---|---|---|---|
| | Fresh Pillared Magadiite (Example 3) | FS-30 (Example 1) | Pillared Clay (Example 2) |
| Temperature, °C. | 510 | 510 | 510 |
| Cat/Oil | 5 | 5 | 5.0 |
| WHSV, hr$^{-1}$ | 2.53 | 2.16 | 4.3 |
| Product Analysis, wt. % | | | |
| $C_1$ | 0.45 | 0.21 | 0.43 |
| $C_2$'s | 2.16 | 0.92 | 1.01 |
| $C_3$ | 2.27 | 0.85 | 0.42 |
| $C_3$= | 7.63 | 3.38 | 2.82 |
| i-$C_4$ | 5.59 | 2.92 | 0.46 |
| n-$C_4$ | 0.76 | 1.12 | 0.11 |
| $C_4$='s | 5.86 | 8.49 | 1.37 |
| $C_5$-330° F. | 23.48 | 27.81 | 12.20 |
| 330°-420° F. | 5.36 | 9.54 | 11.49 |
| 420°-650° F. | 22.16 | 28.89 | 22.64 |
| 650°-850° F. | 11.02 | 9.48 | 21.12 |
| 850° F.+ | 1.14 | 1.13 | 6.97 |
| % Coke | 12.12 | 5.26 | 18.96 |
| Product Selectivities | | | |
| Dry Gas | 3.81 | 1.61 | 2.74 |
| $C_4$− | 36.08 | 25.53 | 12.59 |
| $C_5$ to 330° F. | 23.12 | 39.70 | 23.21 |
| $C_5$ to 420° F. | 37.41 | 53.31 | 45.06 |
| 420° to 650° F. | 4.12 | 13.63 | 6.28 |
| Coke | 17.80 | 7.50 | 36.07 |
| Conversion to 650° F.− | 68.50 | 70.05 | 52.57 |
| Conversion to 420° F.− | 65.68 | 60.50 | 49.27 |

TABLE 7-continued

Comparison of JSHGO Product Distribution at 5 Cat/Oil Ratio

| | Catalyst | | |
|---|---|---|---|
| | Fresh Pillared Magadiite (Example 3) | FS-30 (Example 1) | Pillared Clay (Example 2) |
| Conversion to 330° F.⁻ | 60.32 | 50.96 | 37.78 |

TABLE 8

Comparison of Statfjord Product Distribution at 70 wt. % Conversion

| | Catalyst | |
|---|---|---|
| | Steamed Pillared Magadiite (Example 4) | FS-30 (Example 1) |
| Temperature, °C. | 510 | 510 |
| Cat/Oil | 5.0 | 3.0 |
| WHSV, hr$^{-1}$ | 2.14 | 3.61 |
| Product Analysis, wt. % | | |
| $C_1$ | 0.05 | 0.26 |
| $C_2$'s | 1.95 | 2.86 |
| $C_3$ | 1.00 | 1.21 |
| $C_3=$ | 9.22 | 8.11 |
| i-$C_4$ | 1.55 | 1.30 |
| n-$C_4$ | 0.30 | 0.31 |
| $C_4=$'s | 4.86 | 3.86 |
| $C_5$-330° F. | 15.25 | 25.27 |
| 330°-420° F. | 2.98 | 5.79 |
| 420°-650° F. | 20.30 | 20.97 |
| 650°-850° F. | 18.49 | 10.58 |
| 850°-1050° F. | 3.58 | 3.17 |
| 1050° F.+ | 2.17 | 7.14 |
| % Coke | 18.34 | 9.17 |
| Product Selectivities | | |
| Dry Gas | 3.04 | 4.52 |
| $C_4-$ | 28.81 | 25.96 |
| $C_5$ to 330° F. | 23.21 | 36.62 |
| $C_5$ to 420° F. | 27.75 | 45.01 |
| 420° to 650° F. | 15.52 | 15.75 |
| Coke | 27.91 | 13.29 |

TABLE 9

Comparison of JSHGO Product over Equilibrium FS-30 (Example 1 Catalyst)

| | | Run Number | | |
|---|---|---|---|---|
| | FEED | 60 | 62 | 65 |
| Temperature, °C. | | 510 | 510 | 510 |
| Cat/Oil | | 12 | 8 | 5 |
| Zeolite/Oil | | 1.0 | 0.67 | 0.41 |
| WHSV, hr$^{-1}$ | | 0.92 | 1.35 | 2.16 |
| Grams of Oil Fed | | 29.1 | 24.1 | 57.5 |
| cc of Oil Fed | | 32.7 | 27.0 | 64.3 |
| No. of Cycles | | 7 | 4 | 6 |
| Mass balance | | 89.1 | 97.7 | 94.5 |
| Product Analysis, wt. % | | | | |
| $C_1$ | | 0.60 | 0.35 | 0.21 |
| $C_2$'s | | 1.85 | 1.89 | 0.92 |
| $C_3$ | | 1.94 | 1.86 | 0.85 |
| $C_3=$ | | 5.29 | 5.28 | 3.38 |
| i-$C_4$ | | 5.43 | 5.03 | 2.92 |
| n-$C_4$ | | 1.05 | 1.07 | 1.12 |
| $C_4=$'s | | 4.27 | 5.75 | 8.49 |
| $C_5$-330° F. | | 30.28 | 30.67 | 27.81 |
| 330°-420° F. | | 6.58 | 8.55 | 9.54 |
| 420°-650° F. | 19.34 | 20.36 | 26.32 | 28.89 |
| 650°-850° F. | 58.97 | 4.85 | 5.39 | 9.48 |
| 850° F.+ | 21.69 | 0.69 | 1.06 | 1.13 |
| % Coke | | 16.81 | 6.78 | 5.26 |
| Product Selectivities | | | | |
| Dry Gas | | 3.26 | 2.96 | 1.61 |
| $C_4-$ | | 27.20 | 28.59 | 25.53 |
| $C_5$ to 330° F. | | 40.31 | 41.32 | 39.70 |
| $C_5$ to 420° F. | | 46.89 | 52.85 | 53.31 |
| 420° to 650° F. | | 1.36 | 9.40 | 13.63 |
| Coke | | 22.38 | 9.14 | 7.50 |
| Conversion to 650° F.⁻ | | 75.12 | 74.21 | 70.05 |
| Conversion to 420° F.⁻ | | 74.10 | 67.22 | 60.50 |
| Conversion to 330° F.⁻ | | 67.52 | 58.97 | 50.96 |

TABLE 10

Conversion of JSHGO over Equilibrium FS-30 (Example 1 Catalyst)

| | Run Number | |
|---|---|---|
| | 67 | 68 |
| Temperature, °C. | 510 | 510 |
| Cat/Oil | 3 | 2.2 |
| Zeolite/Oil | 0.25 | 0.18 |
| WHSV, hr$^{-1}$ | 2.69 | 3.05 |
| Grams of Oil Fed | 47.7 | 40.6 |
| cc of Oil Fed | 53.4 | 45.4 |
| No. of Cycles | 4 | 3 |
| Mass balance | 96.1 | 93.5 |
| Product Analysis, wt. % | | |
| $C_1$ | 0.20 | 0.19 |
| $C_2$'s | 0.71 | 0.59 |
| $C_3$ | 0.63 | 0.89 |
| $C_3=$ | 2.80 | 1.99 |
| i-$C_4$ | 2.33 | 1.90 |
| n-$C_4$ | 0.91 | 0.54 |
| $C_4=$'s | 6.38 | 3.24 |
| $C_5$-330° F. | 27.92 | 24.74 |
| 330°-420° F. | 9.59 | 10.81 |
| 420°-650° F. | 31.17 | 35.00 |
| 650°-850° F. | 11.89 | 14.33 |
| 850° F.+ | 1.27 | 2.37 |
| % Coke | 4.19 | 3.38 |
| Product Selectivities | | |
| Dry Gas | 1.34 | 1.22 |
| $C_4-$ | 20.68 | 14.60 |
| $C_5$ to 330° F. | 41.36 | 38.68 |
| $C_5$ to 420° F. | 55.57 | 55.58 |
| 420° to 650° F. | 17.52 | 24.48 |
| Coke | 6.20 | 5.28 |
| Conversion to 650° F.⁻ | 67.50 | 63.96 |
| Conversion to 420° F.⁻ | 55.66 | 48.27 |
| Conversion to 330° F.⁻ | 46.07 | 37.46 |

TABLE 11

Conversion of JSHGO over Pillared Clay (Example 2 Catalyst)

| | Run Number | | | |
|---|---|---|---|---|
| | 82 | 83 | 84 | Thermal |
| Temperature, °C. | 510 | 510 | 510 | 510 |
| Cat/Oil | 5.0 | 3.0 | 1.5 | — |
| WHSV, hr$^{-1}$ | 4.3 | 7.1 | 14.3 | 10.1 |
| Grams of Oil Fed | 43.12 | 54.35 | 49.0 | 54.2 |
| cc of Oil Fed | 48.4 | 61.0 | 55.0 | 60.8 |
| No. of Cycles | 7 | 5 | 4 | 4 |
| Mass balance | 98.2 | 90.9 | 97.5 | 99.3 |
| Product Analysis, wt. % | | | | |
| $C_1$ | 0.43 | 0.27 | 0.18 | 0.21 |
| $C_2$'s | 1.01 | 0.72 | 0.40 | 0.49 |
| $C_3$ | 0.42 | 0.31 | 0.21 | 0.20 |
| $C_3=$ | 2.82 | 1.97 | 1.07 | 1.02 |
| i-$C_4$ | 0.45 | 0.29 | 0.22 | 0.17 |
| n-$C_4$ | 0.11 | 0.10 | 0.10 | 0.09 |
| $C_4=$'s | 1.37 | 1.09 | 0.62 | 0.43 |
| $C_5$-330° F. | 12.20 | 7.14 | 2.23 | |
| 330°-420° F. | 11.49 | 7.92 | 2.03 | 1.02 |
| 420°-650° F. | 22.64 | 21.64 | 20.51 | 21.36 |
| 650°-850° F. | 21.12 | 49.32 | 51.88 | 53.16 |
| 850° F.+ | 6.97 | 11.17 | 17.68 | 19.16 |
| % Coke | 18.96 | 9.23 | 2.87 | 1.07 |

TABLE 11-continued

Conversion of JSHGO over Pillared Clay (Example 2 Catalyst)

| | Run Number | | | |
|---|---|---|---|---|
| | 82 | 83 | 84 | Thermal |
| Product Selectivities | | | | |
| Dry Gas | 2.74 | 3.16 | 5.22 | 8.39 |
| C4— | 12.59 | 15.16 | 25.22 | 31.29 |
| C5 to 330° F. | 23.21 | 22.78 | 20.01 | 19.42 |
| C5 to 420° F. | 45.06 | 48.05 | 38.37 | 31.65 |
| 420° to 650° F. | 6.28 | 7.34 | 10.54 | 24.22 |
| Coke | 36.07 | 29.45 | 38.07 | 12.82 |
| Conversion to 650° F.⁻ | 52.57 | 31.34 | 11.11 | 8.34 |
| Conversion to 420° F.⁻ | 49.27 | 29.04 | 9.93 | 6.32 |
| Conversion to 330° F.⁻ | 37.78 | 21.12 | 7.90 | 5.30 |

TABLE 12

Conversion of JSHGO over Synthetic Magadiite (Example 3 Catalyst)

| Run Number | FEED | 69 | 75 | 77 |
|---|---|---|---|---|
| Temperature, °C. | | 510 | 510 | 510 |
| Cat/Oil | | 5 | 3 | 2 |
| WHSV, hr⁻¹ | | 2.53 | 4.72 | 6.54 |
| Grams of Oil Fed | | 34.87 | 55.72 | 38.60 |
| cc of Oil Fed | | 39.0 | 62.4 | 43.2 |
| No. of Cycles | | 7 | 6 | 3 |
| Mass balance | | 87.4 | 100.7 | 96.2 |
| Product Analysis, wt. % | | | | |
| C1 | | 0.45 | 0.44 | 0.41 |
| C2's | | 2.16 | 1.57 | 0.91 |
| C3 | | 2.27 | 1.62 | 1.64 |
| C3= | | 7.63 | 5.54 | 5.94 |
| i-C4 | | 5.59 | 4.66 | 4.46 |
| n-C4 | | 0.76 | 0.78 | 0.72 |
| C4='s | | 5.86 | 5.89 | 5.20 |
| C5 - 330° F. | | 23.48 | 17.17 | 17.84 |
| 330°-420° F. | | 5.36 | 5.08 | 6.08 |
| 420°-650° F. | 19.34 | 22.16 | 29.90 | 31.36 |
| 650°-850° F. | 58.97 | 11.02 | 17.39 | 18.18 |
| 850° F.+ | 21.69 | 1.14 | 1.50 | 1.54 |
| % Coke | | 12.12 | 8.43 | 5.35 |
| Product Selectivities | | | | |
| Dry Gas | | 3.81 | 3.25 | 2.17 |
| C4— | | 36.08 | 33.23 | 31.93 |
| C5 to 330° F. | | 23.12 | 27.80 | 29.40 |
| C5 to 420° F. | | 37.41 | 36.02 | 39.40 |
| 420° to 650° F. | | 4.12 | 17.10 | 19.80 |
| Coke | | 17.80 | 13.65 | 8.18 |
| Conversion to 650° F.⁻ | | 68.50 | 61.77 | 60.70 |
| Conversion to 420° F.⁻ | | 65.68 | 51.21 | 48.68 |
| Conversion to 330° F.⁻ | | 60.32 | 46.13 | 42.60 |

TABLE 13

Conversion of JSHGO over Synthetic Magadiite (Example 3 Catalyst)

| Run Number | 78 | 81 |
|---|---|---|
| Temperature, °C. | 510 | 510 |
| Cat/Oil | 1.5 | 4 |
| WHSV, hr⁻¹ | 6.84 | 3.30 |
| Grams of Oil Fed | 53.9 | 52.0 |
| cc of Oil Fed | 60.4 | 58.2 |
| No. of Cycles | 4 | 8 |
| Mass balance | 95.6 | 100.3 |
| Product Analysis, wt. % | | |
| C1 | 0.25 | 0.56 |
| C2's | 0.95 | 1.69 |
| C3 | 1.23 | 1.92 |
| C3= | 4.52 | 6.60 |
| i-C4 | 3.35 | 5.25 |
| n-C4 | 0.54 | 0.71 |
| C4='s | 3.97 | 5.23 |
| C5 - 330° F. | 19.73 | 19.25 |
| 330°-420° F. | 5.92 | 5.24 |
| 420°-650° F. | 32.09 | 27.04 |
| 650°-850° F. | 21.96 | 13.80 |
| 850° F.+ | 2.17 | 1.07 |
| % Coke | 3.45 | 11.64 |

TABLE 13-continued

Conversion of JSHGO over Synthetic Magadiite (Example 3 Catalyst)

| Product Selectivities | | |
|---|---|---|
| Dry Gas | 2.12 | 3.42 |
| C4— | 26.20 | 33.38 |
| C5 to 330° F. | 34.90 | 29.26 |
| C5 to 420° F. | 45.37 | 37.22 |
| 420° to 650° F. | 22.55 | 11.70 |
| Coke | 6.10 | 17.69 |
| Conversion to 650° F.⁻ | 56.53 | 65.79 |
| Conversion to 420° F.⁻ | 43.78 | 58.09 |
| Conversion to 330° F.⁻ | 37.86 | 52.85 |

TABLE 14

Conversion of Statfjord long Resid over Steamed Synthetic Magadiite (Example 4 Catalyst)

| Run Number | FEED | 92 | 93/94 | 95 |
|---|---|---|---|---|
| Temperature, °C. | | 510 | 510 | 510 |
| Cat/Oil | | 2.0 | 3.0 | 5.0 |
| WHSV, hr⁻¹ | | 5.26 | 3.51 | 2.14 |
| Grams of Oil Fed | | 43.75 | 43.75 | 44.63 |
| cc of Oil Fed | | 50 | 50 | 51 |
| No. of Cycles | | 4 | 6 | 10 |
| Mass balance | | 98.5 | 96.5 | 97.3 |
| Product Analysis, wt. % | | | | |
| C1 | | 0.06 | 0.07 | 0.05 |
| C2's | | 1.51 | 1.83 | 1.95 |
| C3 | | 0.84 | 0.86 | 1.00 |
| C3= | | 5.55 | 6.43 | 9.22 |
| i-C4 | | 0.91 | 1.06 | 1.55 |
| n-C4 | | 0.20 | 0.24 | 0.30 |
| C4='s | | 2.25 | 3.12 | 4.86 |
| C5 - 330° F. | | 12.31 | 16.13 | 15.25 |
| 330° - 420° F. | | 4.18 | 3.33 | 2.98 |
| 420° - 650° F. | 10.1 | 21.16 | 19.36 | 20.30 |
| 650° - 850° F. | 33.9 | 28.14 | 24.69 | 18.49 |
| 850° - 1050° F. | 39.0 | 7.14 | 5.34 | 3.58 |
| 1050° F.+ | 17.0 | 5.14 | 3.41 | 2.17 |
| % Coke | | 10.55 | 14.14 | 18.34 |
| Product Selectivities | | | | |
| Dry Gas | | 3.18 | 3.36 | 3.04 |
| C4— | | 22.91 | 24.10 | 28.81 |
| C5 to 330° F. | | 24.90 | 28.60 | 23.21 |
| C5 to 420° F. | | 33.36 | 34.46 | 27.75 |
| 420° to 650° F. | | 22.38 | 16.40 | 15.52 |
| Coke | | 21.34 | 25.04 | 27.91 |
| Conversion to 650° F.⁻ | | 49.42 | 56.47 | 65.70 |
| Conversion to 420° F.⁻ | | 38.36 | 47.21 | 55.50 |
| Conversion to 330° F.⁻ | | 34.18 | 43.88 | 52.52 |

TABLE 15

Conversion of Statfjord Long Resid over Steamed Synthetic Magadiite (Example 4 Catalyst)

| Run Number | 96 | Thermal |
|---|---|---|
| Temperature, °C. | 510 | 510 |
| Cat/Oil | 1.75 | — |
| WHSH, hr⁻¹ | 6.04 | 5.26 |
| Grams of Oil Fed | 50.22 | 53.2 |
| cc of Oil Fed | 57.40 | 60.8 |
| No. of Cycles | 4 | 6 |
| Mass balance | 98.5 | 99.3 |
| Product Analysis, wt. % | | |
| C1 | 0.07 | 0.45 |
| C2's | 1.41 | 4.28 |
| C3 | 0.81 | 0.13 |
| C3= | 4.51 | 1.72 |
| i-C4 | 0.77 | 0.02 |
| n-C4 | 0.21 | 0.03 |
| C4='s | 2.00 | 0.06 |
| C5 - 330° F. | 9.81 | 8.80 |
| 330°-420° F. | 5.28 | 3.15 |
| 420°-650° F. | 22.64 | 19.14 |
| 650°-850° F. | 29.43 | 33.75 |
| 850°-1050° F. | 8.30 | 13.62 |
| 1050° F.+ | 6.52 | 12.03 |
| % Coke | 8.23 | 2.27 |

TABLE 15-continued

Conversion of Statfjord Long Resid over
Steamed Synthetic Magadiite (Example 4 Catalyst)

| Product Selectivities | | |
|---|---|---|
| Dry Gas | 3.24 | 15.80 |
| C₄— | 21.43 | 22.34 |
| C₅ to 330° F. | 21.50 | 29.38 |
| C₅ to 420° F. | 33.06 | 39.90 |
| 420° to 650° F. | 27.48 | 30.18 |
| Coke | 18.03 | 7.58 |
| Conversion to 650° F.⁻ | 45.64 | 29.95 |
| Conversion to 420° F.⁻ | 33.10 | 20.91 |
| Conversion to 330° F.⁻ | 27.82 | 17.76 |

TABLE 16

Conversion of Statfjord Long Resid over Equilibrium FS-30
(Example 1 Catalyst)

| Run Number | FEED | 99 | 97 | 98 |
|---|---|---|---|---|
| Temperature, °C. | | 510 | 510 | 510 |
| Cat/Oil | | 3.0 | 5.0 | 7.0 |
| WHSV, hr⁻¹ | | 3.61 | 2.1 | 1.95 |
| Grams of Oil Fed | | 48.8 | 52.5 | 62.1 |
| cc of Oil Fed | | 55.8 | 60 | 71 |
| No. of Cycles | | 4 | 6 | 10 |
| Mass balance | | 94.5 | 98.3 | 99.3 |
| Product Analysis, wt. % | | | | |
| C₁ | | 0.26 | 0.38 | 0.34 |
| C₂'s | | 2.86 | 3.67 | 4.02 |
| C₃ | | 1.21 | 1.31 | 1.70 |
| C₃= | | 8.11 | 9.12 | 11.34 |
| i-C₄ | | 1.30 | 1.49 | 1.82 |
| n-C₄ | | 0.31 | 0.52 | 0.44 |
| C₄='s | | 3.86 | 4.39 | 5.42 |
| C₅ - 330° F. | | 25.27 | 30.13 | 32.14 |
| 330°–420° F. | | 5.79 | 6.03 | 5.30 |
| 420°–650° F. | 10.1 | 20.97 | 17.06 | 13.27 |
| 650°–850° F. | 33.90 | 10.58 | 6.22 | 4.17 |
| 850° F.⁺ | 56.0 | 10.31 | 7.08 | 5.77 |
| % Coke | | 9.17 | 12.10 | 14.27 |
| Product Selectivities | | | | |
| Dry Gas | | 4.52 | 5.32 | 5.45 |
| C₄— | | 25.96 | 27.43 | 31.37 |
| C₅ to 330° F. | | 36.62 | 39.60 | 40.20 |
| C₅ to 420° F. | | 45.01 | 47.52 | 46.82 |
| 420° to 650° F. | 15.75 | 9.30 | 4.09 | |
| Coke | | 13.29 | 15.90 | 17.85 |
| Conversion to 650° F.⁻ | | 69.01 | 76.10 | 79.96 |
| Conversion to 420° F.⁻ | | 58.14 | 69.14 | 76.79 |
| Conversion to 330° F.⁻ | | 53.35 | 64.11 | 71.49 |
| Crackability | | 1.39 | 2.24 | 3.31 |

TABLE 17

Conversion of Statfjord Long Resid over
Unsteamed Hydrogen Form of Magadiite
(Example 5 Catalyst)

| Run Number | FEED | 147 | 146 | 148 |
|---|---|---|---|---|
| Temperature, °C. | | 510 | 510 | 510 |
| Cat/Oil | | 1.5 | 3.0 | 5.0 |
| WHSV, hr⁻¹ | | 7.25 | 3.83 | 2.48 |
| Grams of Oil Fed | | 68.0 | 75.8 | 38.3 |
| cc of Oil Fed | | 78.0 | 87.2 | 43.87 |
| No. of Cycles | | 5 | 11.3 | 8 |
| Mass balance | | 95.4 | 97.2 | 96.3 |
| Product Analysis, wt. % | | | | |
| C₁ | | 0.28 | 0.40 | 0.48 |
| C₂'s | | 0.61 | 2.59 | 3.40 |
| C₃ | | 1.51 | 2.18 | 2.42 |
| C₃= | | 10.27 | 12.06 | 14.21 |
| i-C₄ | | 3.03 | 4.30 | 4.48 |
| n-C₄ | | 0.47 | 0.61 | 0.69 |
| C₄='s | | 4.45 | 5.90 | 7.81 |
| C₅ - 330° F. | | 23.36 | 26.76 | 23.36 |
| 330°–420° F. | | 8.77 | 7.34 | 6.46 |
| 42°- 650° F. | 10.1 | 20.79 | 14.70 | 14.47 |
| 650°–850° F. | 33.90 | 11.23 | 6.21 | 4.97 |
| 850° F.⁺ | 56.0 | 4.08 | 2.64 | 1.92 |
| % Coke | | 11.15 | 14.30 | 15.32 |

TABLE 17-continued

Conversion of Statfjord Long Resid over
Unsteamed Hydrogen Form of Magadiite
(Example 5 Catalyst)

| Product Selectivities | | | |
|---|---|---|---|
| Dry Gas | 1.19 | 3.69 | 4.73 |
| C₄— | 27.64 | 34.60 | 40.64 |
| C₅ to 330° F. | 31.32 | 33.02 | 28.49 |
| C₅ to 420° F. | 43.08 | 42.08 | 36.37 |
| 420° to 650° F. | 14.33 | 5.68 | 4.11 |
| Coke | 14.95 | 17.64 | 18.68 |
| Conversion to 650° F.⁻ | 74.59 | 81.04 | 82.00 |
| Conversion to 420° F.⁻ | 63.90 | 76.40 | 77.63 |
| Conversion to 330° F.⁻ | 55.13 | 69.06 | 71.17 |
| Crackability | 1.77 | 3.23 | 3.47 |

TABLE 18

Conversion of Statfjord Long Resid over
Rare Earth Exchanged Magadiite
(Example 6 Catalyst)

| Run Number | FEED | 120 | 119 | 121 |
|---|---|---|---|---|
| Temperature, °C. | | 510 | 510 | 510 |
| Cat/Oil | | 1.5 | 3.0 | 5.0 |
| WHSV, hr⁻¹ | | 7.25 | 3.83 | 2.48 |
| Grams of Oil Fed | | 52.4 | 44.4 | 28.7 |
| cc of Oil Fed | | 60.4 | 51.2 | 33.2 |
| No. of Cycles | | 5 | 8 | 8 |
| Mass balance | | 99.3 | 87.2 | 94.8 |
| Product Analysis, wt. % | | | | |
| C₁ | | 0.33 | 0.27 | 0.24 |
| C₂ | | 0.82 | 1.03 | 1.16 |
| C₂= | | 1.02 | 1.21 | 1.94 |
| C₃ | | 0.26 | 0.58 | 0.63 |
| C₃= | | 10.33 | 15.55 | 15.97 |
| i-C₄ | | 3.36 | 4.44 | 3.76 |
| n-C₄ | | 0.67 | 0.76 | 0.97 |
| C₄='s | | 6.22 | 6.12 | 5.99 |
| C₅ - 330° F. | | 21.43 | 24.25 | 25.68 |
| 330°–420° F. | | 8.94 | 7.93 | 6.80 |
| 420°–650° F. | 10.1 | 24.48 | 20.43 | 17.91 |
| 650°–850° F. | 33.9 | 13.77 | 7.97 | 8.44 |
| 850° F.⁺ | 56.0 | 1.74 | 0.90 | 0.87 |
| % Coke | | 6.61 | 8.56 | 9.62 |
| Product Selectivities | | | | |
| Dry Gas | | 2.92 | 3.10 | 4.15 |
| C₄— | | 30.94 | 36.97 | 38.05 |
| C₅ to 330° F. | | 28.82 | 29.93 | 31.87 |
| C₅ to 420° F. | | 40.83 | 39.71 | 40.31 |
| 420° to 650° F. | | 12.02 | 12.75 | 9.69 |
| Coke | | 8.90 | 10.56 | 11.94 |
| Conversion to 650° F.⁻ | | 74.37 | 81.03 | 80.57 |
| Conversion to 420° F.⁻ | | 60.00 | 70.70 | 72.76 |
| Conversion to 330° F.⁻ | | 51.05 | 62.77 | 65.96 |
| Crackability | | 1.50 | 2.41 | 2.77 |

TABLE 19

Conversion of Statfjord Long Resid over
Steamed Rare Earth Exchanged Magadiite
(Example 7 Catalyst)

| Run Number | FEED | 173 | 168 | 170 |
|---|---|---|---|---|
| Temperature, °C. | | 510 | 510 | 510 |
| Cat/Oil | | 1.5 | 3.0 | 5.0 |
| WHSV, hr⁻¹ | | 7.3 | 3.8 | 2.6 |
| Grams of Oil Fed | | 58.4 | 116.8 | 65.3 |
| cc of Oil Fed | | 67.3 | 134.4 | 74.6 |
| No. of Cycles | | 5 | 20 | 16 |
| Mass balance | | 102.5 | 95.7 | 98.3 |
| Product Analysis, wt. % | | | | |
| C₁ | | 0.37 | 0.39 | 0.48 |
| C₂ | | 1.82 | 2.18 | 2.35 |
| C₃ | | 0.18 | 0.30 | 0.32 |
| C₃= | | 5.35 | 8.66 | 9.49 |
| i-C₄ | | 2.15 | 3.25 | 3.08 |
| n-C₄ | | 0.38 | 0.31 | 0.32 |
| C₄='s | | 5.38 | 5.20 | 5.12 |
| C₅ - 330° F. | | 18.64 | 20.52 | 25.04 |
| 330°–420° F. | | 7.66 | 7.17 | 6.48 |

TABLE 19-continued

Conversion of Statfjord Long Resid over
Steamed Rare Earth Exchanged Magadiite
(Example 7 Catalyst)

| | | | |
|---|---|---|---|
| 420°-650° F. | 10.1 | 26.43 | 21.04 | 20.00 |
| 650°-850° F. | 33.9 | 18.63 | 16.24 | 13.56 |
| 850° F.+ | 56.0 | 5.98 | 4.77 | 2.72 |
| % Coke | | 7.03 | 9.97 | 11.04 |
| Product Selectivities (Based on 650−) | | | | |
| Dry Gas ($C_1 + C_2$) | | 1.70 | 2.06 | 2.16 |
| $C_4-$ | | 23.94 | 29.45 | 28.74 |
| $C_5$ to 330° F. | | 28.54 | 29.79 | 34.01 |
| $C_5$ to 420° F. | | 40.28 | 40.19 | 42.81 |
| 420° to 650° F. | | 40.48 | 30.54 | 27.17 |
| Coke | | 10.76 | 14.47 | 15.00 |
| Conversion to 650° F.− | | 65.29 | 68.89 | 73.62 |
| Conversion to 420° F.− | | 48.96 | 57.95 | 63.72 |
| Conversion to 330° F.− | | 41.30 | 50.78 | 57.24 |
| Crackability | | 0.96 | 1.37 | 1.76 |

As can be seen from Table 7, the silica-alumina pillared magadiite is significantly more active than the pillared clay. Also, as shown in Table 8 (composite of data from Tables 14–16) the steamed magadiite produced a heavier product than the equilibrium FS-30 catalyst when cracking the Statfjord resid. This may be indicative of the larger pore structure of the catalyst. The converted products from the magadiite are small enough to be further converted over a conventional large pore cracking catalyst if higher gasoline selectivity if desired.

One of the important aspects of the rare-earth exchange is the dramatic reduction in the coking tendency of the catalyst. This low coke selectivity appears to be an improvement even over commercial equilibrium catalysts. Furthermore, when the rare-earth exchanged magadiite catalyst is used, a large portion of the $C_4$- gas is propylene, a valuable feedstock.

The steamed, rare-earth exchanged magadiite is less active than the unsteamed, rare-earth exchanged magadiite, but has much higher distillate selectivity than both unsteamed rare-earth magadiite and the equilibrium REY FCC catalysts tested.

A detailed examination of data set forth in the foregoing Tables reveals that the rare-earth exchanged catalyst incurs far less deactivation as a result of the steaming. Such data is included in Table 14 (steamed magadiite, Example 4 catalyst), Table 15 (steamed magadiite, Example 4 catalyst), Table 17 (unsteamed magadiite, Example 5 catalyst), Table 18 (unsteamed, rare-earth exchanged magadiite, Example 6 catalyst) and Table 19 (steamed, rare-earth exchanged magadiite, Example 7 catalyst) in terms of the wt. percent of conversion to 420° F.-products as a function of the catalyst/oil ration. Table 20 summarizes such data from these Tables. Both of the steamed catalysts were treated with 100% $H_2O$ at 538° C., atmospheric pressure for four hours.

TABLE 20

| Cat./ Oil Ratio | Wt. % Conv. to 420° F.−, Ex. 5 cat. unsteamed | Wt. % Conv. to 420° F.−, Ex. 4. cat. steamed | Wt. % Conv. to 420° F.−, Ex. 6 cat. unsteamed RE | Wt. % Conv. to 420° F.−, Ex. 7 cat. steamed RE |
|---|---|---|---|---|
| 1.5 | 63.90 | | 60.00 | 48.96 |
| 1.75 | | 33.10 | | |
| 2.0 | | 38.36 | | |
| 3.0 | 76.40 | 47.21 | 70.70 | 57.95 |
| 5.0 | 77.63 | 55.50 | 72.76 | 63.72 |

A detailed examination of data set forth in the foregoing Tables also reveals that the magadiite catalysts are more selective for bottoms cracking than the REY catalyst, particularly in terms of 850° F.+ yield as a function of wt. % conversion to 420° F.-products. Such data is included in Table 14 (steamed magadiite, Example 4 catalyst), Table 16 (equilibrium REY, Example 1 catalyst), Table 17 (unsteamed magadiite, Example 5 catalyst), Table 18 (unsteamed, rare-earth exchanged magadiite, Example 6 catalyst) and Table 19 (steamed, rare earth exchanged magadiite, Example 7 catalyst). Table 21 summarizes such data from these Tables. The magadiite based catalysts convert more of the heavy 850° F.+ material than does the zeolite based commercial catalyst.

TABLE 21

| Wt. % Conv. to 420° F.− | 850° F.+ Yield, Ex. 1 cat. REY | 850° F. Yield, Ex. 4. cat. steamed magadiite | 850° F. Yield, Ex. 5 cat. unsteamed RE magadiite | 850° F. Yield, Ex. 6 cat. steamed RE magadiite | 850° F. Yield, Ex. 7 cat. steamed RE magadiite |
|---|---|---|---|---|---|
| 55.50 | | 5.75 | | | |
| 57.95 | | | | | 4.77 |
| 58.14 | 10.31 | | | | |
| 60.00 | | | | 1.74 | |
| 63.72 | | | | | 2.72 |
| 63.90 | | | 4.08 | | |
| 69.14 | 7.08 | | | | |
| 70.70 | | | | 0.90 | |
| 72.76 | | | | 0.87 | |
| 76.40 | | | 2.64 | | |
| 76.79 | 5.77 | | | | |
| 77.63 | | | 1.92 | | |

What is claimed is:

1. A process for cracking a hydrocarbon feedstock, said hydrocarbon feedstock having at least 50 weight percent of hydrocarbons having a boiling point of greater than 343° C., said process comprising contacting said feedstock with a pillared layered silicate cracking catalyst under sufficient cracking conditions, said catalyst comprising a layered silicate containing interspathic polymeric silica pillars, said layered silicate lacking the octahedral sheets of clays, wherein the cracking reaction occurs in the absence of added hydrogen.

2. A process according to claim 1, wherein said layered silicate further contains an interspathic polymeric oxide of an element selected from the group consisting of Al, B, Cr, Ga, In, Mo, No, Ni, Ti, Tl, W and Zr.

3. A process according to claim 1, wherein said layered silicate further contains an interspathic polymeric oxide of Al.

4. A process according to claim 1, wherein said cracking occurs at temperature ranging from about 250° C. to about 500° C. and liquid hourly space velocities ranging from about 0.05 to about 10.

5. A process according to claim 1, wherein said layered silicate comprising interspathic polymeric silica has an interlayer distance greater than about 10 angstroms.

6. A process according to claim 5, wherein said interlayer distance is greater than about 15 angstroms.

7. A process according to claim 5, wherein said layered silicate contains an interspathic polymeric oxide of aluminum.

8. A process according to claim 1, wherein said layered silicate is selected from the group consisting of magadiite, natrosilite, kenyaite, makatite, nekoite, kanemite, okenite, dehayelite, macdonaldite and rhodesite.

9. A process according to claim 1, wherein said layered silicate is magadiite.

10. A process for cracking a hydrocarbon feedstock, said hydrocarbon feedstock having at least 30 weight percent of hydrocarbons having a boiling point of greater than 454° C., said process comprising contacting said feedstock with a pillared layered silicate cracking catalyst under sufficient cracking conditions, said catalyst comprising a layered silicate containing interspathic polymeric silica pillars, said layered silicate lacking the octahedral sheets of clays, wherein the cracking reaction occurs in the absence of added hydrogen.

11. A process according to claim 10, wherein said layered silicate further contains an interspathic polymeric oxide in an element selected from the group consisting of Al, B, Cr, Ga, In, Mo, Nb, Ni, Ti, Tl, W and Zr.

12. A process according to claim 10, wherein said layered silicate further contains an interspathic polymeric oxide of Al.

13. A process according to claim 10, wherein said cracking occurs at temperature ranging from about 250° C. to about 500° C. and liquid hourly space velocities ranging from about 0.005 to about 10.

14. A process according to claim 10, wherein said layered silicate comprising interspathic polymeric silica has an interlayer distance greater than about 10 angstroms.

15. A process according to claim 14, wherein said interlayer distance is greater than about 15 angstroms.

16. A process according to claim 10, wherein said layered silicate contains an interspathic polymeric oxide of aluminum.

17. A process according to claim 10, wherein said layered silicate is selected from the group consisting of magadiite, natrosilite, kenyaite, makatite, nekoite, kanemite, okenite, dehayelite, macdonaldite and rhodesite.

18. A process according to claim 10, wherein said layered silicate is magadiite.

19. A process according to claim 10, wherein said hydrocarbon feedstock comprises at least 45 weight percent of hydrocarbons having a boiling point of greater than 454° C.

20. A process according to claim 10, wherein said feedstock comprises at least 30 wt. % of a residua fraction having an initial boiling point of at least about 343° C.

21. A process for cracking a hydrocarbon feedstock, said hydrocarbon feedstock having at least 10 volume percent of hydrocarbons having a boiling point of greater than 538° C., said process comprising contacting said feedstock with a pillared layered silicate cracking catalyst under sufficient cracking conditions, said catalyst comprising a layered silicate containing interspathic polymeric silica pillars, said layered silicate lacking the octahedral sheets of clays, wherein the cracking reaction occurs in the absence of added hydrogen.

22. A process according to claim 21, wherein said layered silicate further contains an interspathic polymeric oxide of an element selected from the group consisting of Al, B, Cr, Ga, In, Mo, Nb, Ni, Ti, Tl, W and Zr.

23. A process according to claim 21, wherein said layered silicate further contains an interspathic polymeric oxide of Al.

24. A process according to claim 21, wherein said cracking occurs at temperature ranging from about 250° C. to about 500° C. and liquid hourly space velocities ranging from about 0.05 to about 10.

25. A process according to claim 21, wherein said layered silicate comprising interspathic polymeric silica has an interlayer distance greater than about 10 angstroms.

26. A process according to claim 25, wherein said interlayer distance is greater than about 15 angstroms.

27. A process according to claim 25, wherein said layered silicate contains an interspathic polymeric oxide of aluminum.

28. A process according to claim 21, wherein said layered silicate is selected from the group consisting of magadiite, natrosilite, kenyaite, makatite, nekoite, kanemite, okenite, dehayelite, macdonaldite and rhodesite.

29. A process according to claim 21, wherein said layered silicate is magadiite.

30. A process according to claim 21, wherein said hydrocarbon feedstock comprises at least 15 volume percent of hydrocarbons having a boiling point of greater than 538° C.

31. A process according to claim 21, wherein said feedstock comprises at least 30 wt. % of a residua fraction having an initial boiling point of at least about 343° C.

32. A process according to claim 21, wherein said feedstock comprises at least 15 wt. % of a residua fraction having an initial boiling point of at least about 538° C.

33. A process according to claim 31, wherein said residua fraction is not hydrotreated.

34. A process according to claim 33, wherein said feedstock is a blend of said residua fraction with one or more gas oils, said gas oils having an initial boiling point of at least 232° C.

* * * * *

UNITED STATES PATENT AND TRADEMARK OFFICE
CERTIFICATE OF CORRECTION

PATENT NO.  : 5,037,530
DATED       : August 6, 1991
INVENTOR(S) : G.W. Kirker et al.

It is certified that error appears in the above-identified patent and that said Letters Patent is hereby corrected as shown below:

Col. 25, claim 13, line 41, "0.005" should be --0.05--
Col. 25, claim 16, line 48, "10" should be --14--

Signed and Sealed this

Tenth Day of November, 1992

Attest:

DOUGLAS B. COMER

*Attesting Officer*    Acting Commissioner of Patents and Trademarks